United States Patent [19]

McGovern et al.

[11] Patent Number: 5,224,516
[45] Date of Patent: Jul. 6, 1993

[54] PIPE REPAIR TOOL

[76] Inventors: Victor J. McGovern, 14227 Sanford Rd., Milan, Mich. 48160; Robert A. Darr, 2129 Pauline Ct., Ann Arbor, Mich. 48103

[21] Appl. No.: 917,231

[22] Filed: Jul. 23, 1992

[51] Int. Cl.$^5$ .................. F16L 55/12; F16L 55/18
[52] U.S. Cl. ................... 138/97; 138/89; 138/90; 138/93
[58] Field of Search ............ 138/97, 98, 110, 103, 138/90, 89; 29/447, 523, 402.09

[56] References Cited

U.S. PATENT DOCUMENTS

| | | | |
|---|---|---|---|
| 402,600 | 5/1889 | Kemp | 138/90 |
| 551,598 | 12/1895 | O'Connor | 138/90 |
| 922,544 | 5/1909 | Turner et al. | 138/90 |
| 1,177,338 | 3/1916 | Kayfetz | 138/90 |
| 1,226,023 | 5/1917 | Smith | 138/90 |
| 1,297,113 | 3/1919 | Domenico | 138/90 |
| 1,471,184 | 10/1923 | Miles | 138/97 |
| 2,177,916 | 10/1939 | Thomas et al. | 138/90 |
| 2,517,626 | 8/1950 | Berg | 138/97 |
| 2,543,954 | 3/1951 | Barber | 285/22 |
| 2,731,041 | 1/1956 | Mueller et al. | 138/97 |
| 2,756,779 | 7/1956 | Tratzik et al. | 138/97 |
| 2,773,554 | 12/1956 | Lindorf | 138/90 |
| 2,924,246 | 2/1960 | Markel | 138/90 |
| 3,457,959 | 7/1969 | Cooper | 138/90 |
| 3,704,729 | 12/1972 | Tomlinson | 138/90 |
| 4,529,007 | 7/1985 | Goforth | 138/97 |
| 4,589,446 | 5/1986 | Allen | 138/97 |
| 4,602,500 | 7/1986 | Kelly | 138/90 |
| 4,790,356 | 12/1988 | Tash | 138/93 |
| 5,152,311 | 10/1992 | McCreary | 138/97 |

FOREIGN PATENT DOCUMENTS 676280 12/1963 Canada .

*Primary Examiner*—James E. Bryant, III
*Attorney, Agent, or Firm*—Richard C. Litman

[57] ABSTRACT

A tool for use in the repair of fluid conduits or pipes prevents fluid flow along the interior surface of the pipe, while allowing flow through a central bypass tube. The tube also serves to support an expandable plug which is axially compressed by a concentric compression tube surrounding the bypass tube. As the compression tube axially compresses the plug, the plug is forced to expand radially due to the flexible nature of the center section wall and the air entrapped therein. As no great amount of pressure is trapped behind the plug due to the communication of the pipe with the outside environment through the bypass tube, relatively low forces may be used in the actuation of the tool. Moreover, the thin wall or membrane of the center section of the plug permits a relatively wide range of expansion, allowing a single plug to be used in a wide variety of pipe sizes. The tool is particularly suited to use with copper water pipes, but is adaptable to virtually any type of fluid conduit or pipe.

7 Claims, 1 Drawing Sheet

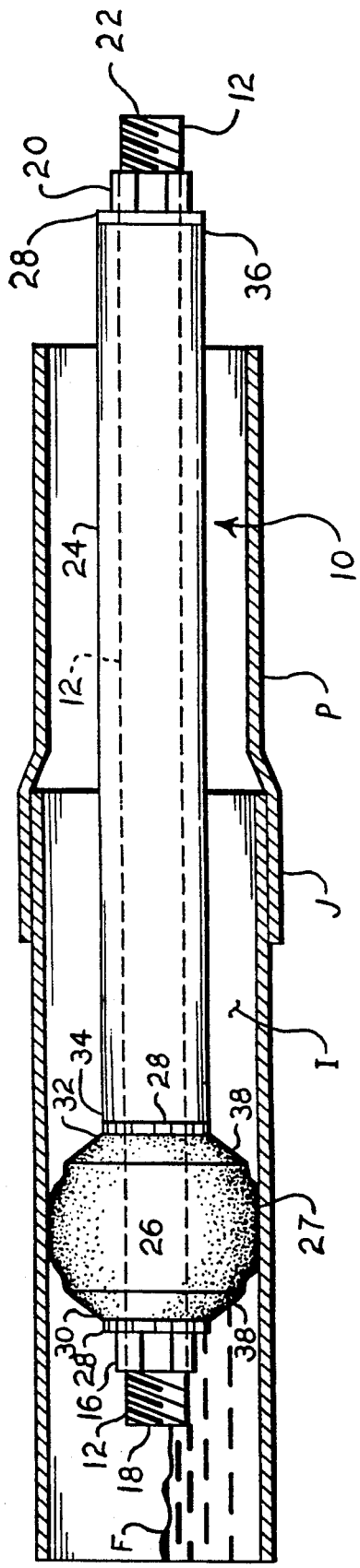
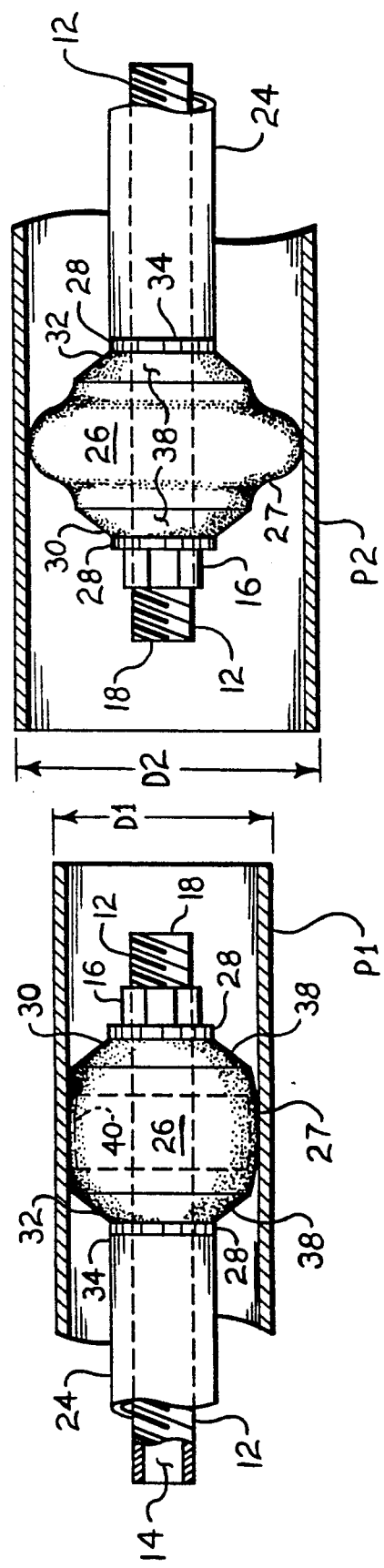
FIG. 1
FIG. 2
FIG. 3

PIPE REPAIR TOOL

FIELD OF THE INVENTION

The present invention relates generally to plumbing tools and the like, and more specifically to a diametrically adjustable tool temporarily installable in a fluid conduit and allowing fluid to pass through the center of the tool.

BACKGROUND OF THE INVENTION

As is well known in the plumbing trade, pipes and other fluid conduits are subject to eventual damage due to corrosion, freezing or other causes. Additionally, it is necessary from time to time to tap into existing plumbing to provide additional fluid lines for system additions. Whatever the reason, when an existing fluid conduit or pipe must be opened for repair or other reasons, the fluid upstream must be shut off in order to permit the required work to be accomplished.

When this fluid is shut off, obviously other fluid lines from between the shutoff point and the repair location cannot be used. Accordingly, it is often desirable to block the conduit or pipe immediately upstream of the repair, to allow fluid to flow to that and other points upstream of the repair. Another advantage of the complete blockage of the fluid line is that there will generally be at least some residual fluid flow in the line, even after a shutoff valve is closed upstream. If heat is to be applied to the pipe (e.g., soldering with a torch or other tool) the fluid will likely preclude the development of sufficient heat to perform the operation, particularly in the bottom of the pipe.

However, the complete blockage of the fluid conduit upstream of the work area may lead to back pressures being developed which may require extreme pressures to be developed when securing such a plug in the conduit or pipe. Such pressures often require relatively high torques to be developed with the tools used to secure the plug, as well as relatively fixed diameters for the solid elastomeric plugs generally used.

The need arises for a fluid pipe or conduit repair tool, which tool provides for the passage of at least some fluid through the center of the tool while at the same time serving to prevent fluid from flowing along the interior walls of the pipe itself. The tool should provide relative flexibility due to the relatively low pressures required for sealing, and thus provide sealing capability for a wide range of pipe or conduit inside diameters with a relatively few tool sizes.

DESCRIPTION OF THE PRIOR ART

U.S. Pat. No. 2,517,626 issued to Solomon Berg on Aug. 8, 1950 discloses a Hollow Repair Device For Leaky Boiler Tubes. The device is intended for permanent repairs, as no provision is disclosed for the removal of the device from the pipe once it is installed. Moreover, a separate tool must be used for the installation of the device.

U.S. Pat. No. 2,543,954 issued to M. E. Barber on Mar. 6, 1951 discloses a Compression By-Pass And Wrench Device. The device requires two special wrenches to be applied simultaneously, to tighten two separate fittings. The tools used to tighten the fittings are specially adapted for use with the device, unlike the present invention.

U.S. Pat. No. 2,731,041 issued to Frank H. Mueller et al. on Jan. 17, 1956 discloses a By-Pass Assembly For Service Pipes. Many of the same points raised in the discussion of the Barber device also apply to this device.

U.S. Pat. No. 2,756,779 issued to F. Tratzik et al. on Jul. 31, 1956 discloses a By-Pass Assembly For Service Pipe And Method Of installation. Again, the limitations of this device are similar to those discussed regarding the Barber device.

Finally, U.S. Pat. No. 4,589,446 issued to Gordon L. Allen on May 20, 1986 discloses a Pipe Repair Bypass Apparatus. While the device provides a similar function to that of the present invention, the temporary concentric bypassing of a fluid conduit, the means used requires a different seal for each size pipe. The seal is moreover larger than the inside diameter of the pipe and must be forced into the pipe, unlike the present invention.

None of the above noted patents, taken either singly or in combination, are seen to disclose the specific arrangement of concepts disclosed by the present invention.

SUMMARY OF THE INVENTION

By the present invention, an improved tool for use in the repair of fluid pipes and other conduits is disclosed. The improved tool provides a variable diameter expandable plug mounted at one end of an actuating tube. The actuating tube is turned, thus exerting a compressive force acting to expand the plug. A bypass tube runs concentrically within the actuating tube to allow accumulated fluid to bypass the tool, and not build up pressure or seep past the seal provided by the plug. Further features of the present invention include a bevel formed in the plug, facilitating insertion and removal of the plug in the pipe, and the variable diameter of the plug.

Accordingly, one of the objects of the present invention is to provide a pipe repair tool which is adaptable to, but not necessarily limited to, the repair of water pipes.

A further object of the present invention is to provide a pipe repair tool which allows the passage of any fluid in the pipe, through the center of the tool in order to provide for the effective repair of the pipe.

Another object of the present invention is to provide a pipe repair tool which is temporarily installable and removable from the interior of the pipe to be repaired.

Yet another object of the present invention is to provide a pipe repair tool which does not require additional special tools for the installation and removal of the pipe repair tool.

An additional object of the present invention is to provide a pipe repair tool which is adaptable to a relatively large variation in pipe interior diameters.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a side view in section of the present invention in use.

FIG. 2 is a partial side view in section of the present invention showing a relatively small expansion of the plug, in use in a relatively small diameter pipe.

FIG. 3 is a partial side view in section of the present invention in a larger diameter pipe, showing a larger expansion of the plug.

Similar reference characters denote corresponding features consistently throughout the several figures of the attached drawings.

DETAILED DESCRIPTION OF THE PREFERRED EMBODIMENT

Referring now to the drawings, particularly FIG. 1 of the drawings, the present invention will be seen to relate to a tool 10 providing for the blockage of a fluid conduit or pipe P in order to preclude fluid flow along the interior surface I of the pipe P and joint J or other area requiring repair. Tool 10 includes a central concentric threaded fluid bypass tube 12, which bypass tube 12 provides for the passage of any fluid F which may back up within pipe P, by means of the central hollow passage 14 (as indicated in the broken away end of tube 12 shown in FIG. 2).

Threaded bypass tube 12 is provided with a retaining nut 16 near its first or sealing end 18, and an opposite actuating nut 20 near its second or actuating end 22. Nuts 16 and 20 serve to capture a compression tube 24 and a preferably hollow, generally cylindrical expandable plug 26 therebetween, with compression tube 24 and expandable plug 26 surrounding and concentric with threaded fluid bypass tube 12. Compression tube 24 is not threaded, but is free to travel axially along bypass tube 12 as permitted by retaining and actuating nuts 16 and 20, and the resistance of expandable plug 26. Washers 28 are positioned axially along bypass tube 12, between retaining nut 16 and the first end 30 of expandable plug 26; between the second end 32 of expandable plug 26 and the first end 34 of compression tube 24; and between actuating nut 20 and the second end 36 of compression tube 24. Washers 28 will be seen to have an inside diameter closely fitting the threaded exterior of bypass tube 12, and an outside diameter sufficiently large to preclude the passage of either compression tube 24 or expandable plug 26 thereover. Bypass tube 12; compression tube 24; nuts 16 and 20; and washers 28 are preferably formed of a durable, corrosion resistant material such as stainless steel, but may be formed of any suitable material providing sufficient strength and durability.

Expandable plug 26 is preferably formed of an elastomer such as rubber and preferably includes a hollow center section, as noted above. Rather than providing a uniformly thin wall for plug 26, the first and second ends 30 and 32 are relatively thick in order to preclude excessive deformation when plug 26 is axially compressed. However, the center section 27 of plug 26 has a relatively thin cylindrical wall or membrane 40, which is capable of great flexibility as tool 10 is used.

Often, when a pipe or conduit P is to be repaired or a joint J replaced, it is difficult to ensure that the interior of such a pipe P is completely dry. In the event that a shutoff valve upstream of the repair area leaks slightly, or the shutoff valve is some distance from the repair area, there may be some residual flow for quite some time which is quite difficult to stop. It is essential that the area of pipe P to be repaired be completely dry, with no residual moisture, fluid, gas, etc. in the immediate area. This is especially critical in repairs using heat, such as the torch soldering of copper pipe. Solder will not adhere to moist surfaces, resulting in a leaky joint if a repair is attempted under those conditions. Moreover, the heat from such a repair will likely cause any residual moisture to build up steam pressure, which in a closed pipe may cause a blowout; such conditions are obviously extremely hazardous.

Tool 10 precludes these problems by preventing the flow of fluid F directly along the inner surface I of a pipe P, while allowing the fluid F (as well as any pressure within pipe P) to pass through the central passage 14 of bypass tube 12. Pipe P is opened at one end (e.g., by means of a cleanout plug or the like) and the sealing end 18 of tool 10 is inserted into pipe P with the actuating end 22 including actuating nut 20 extending from the open end of pipe P. The beveled ends 38 of expandable plug 26 provide for easier insertion and withdrawal of tool 10 from a pipe P. Tool 10 is provided with sufficient length to cause the sealing end 18 of tool 10 to extend past the area of pipe P to be repaired, in order that any fluid F within pipe P will be unable to flow past the sealing end 18 of tool 10 directly along the interior surface I of pipe P. Actuating nut 20 is then turned relative to threaded bypass tube 12, causing compression tube 24 to advance axially relative to bypass tube 12 and pipe P. During this operation pipe P, compression tube 24, and bypass tube 12 have no relative rotational motion; the only relative motion of these components is the advancement of compression tube 24 along bypass tube 12 and into pipe P due to the threaded advancement of actuating nut 20.

The above operation will be seen to cause the first end of compression tube 34 to advance toward retaining nut 16, thereby causing expandable plug 26 to compress axially. As plug 26 is axially compressed, its elastomeric nature in combination with any air captured within, will cause the relatively thin wall 40 of the center section 27 of plug 26 to expand radially to closely conform to the interior of a pipe P into which tool 10 has been inserted.

The relatively thin side wall or membrane 40 of plug 26 allows a relatively large amount of expansion or distension in comparison with relatively solid rubber plugs having only a narrow central passageway for a compression screw or the like. Due to the relatively solid nature of such plugs, the torque required to expand such plugs is relatively high. It can be difficult to prevent relative rotary motion of components of such tools, which often require at least two additional specialized tools for their actuation. Moreover, the relatively high torques generally require a solid central member for strength. As a result, such tools completely block any flow, and may require extremely high seating pressures if fluid pressure builds behind the plug. The present invention requires relatively low actuation torque due to the extremely flexible nature of the thin wall or membrane 40 of the center section 27 of expandable plug 26. Thus, the central threaded tube may be made hollow to allow any fluid F to pass through the central passage 14 of tube 12, thereby precluding any pressure buildup behind plug 26. Thus, relatively low seating pressures are required with tool 10.

Another advantage of the relatively thin wall 40 of the center section 27 of plug 26, is the relatively high degree of radial expansion provided, as in the nature of a balloon. Accordingly, a single plug 26 may be used to seal a variety of pipes of different internal diameters, such as the pipe P1 of FIG. 2 having a relatively small internal diameter D1, and the pipe P2 of FIG. 3 having a relatively large internal diameter D2. Tools using solid plugs require virtually a different plug for each different pipe internal diameter.

As noted above, no pressure is allowed to build up behind expandable plug 26 due to the communication of the interior volume of pipe P behind plug 26 with the outside environment by means of the hollow core 14 of bypass tube 12. Any fluid F which rises to the level of bypass tube 12, will flow through bypass tube 12 to be drained as desired. A drain hose may be slipped over the second or actuating end of bypass tube 12 and run to a drain or catch container as desired.

When the repair of pipe P is completed, tool 10 may be easily removed by loosening actuating nut 20 to allow compression tube 24 to travel axially outward from pipe P, as expandable plug 26 relaxes to its natural uncompressed shape. When plug 26 has relaxed to a diameter sufficiently small to allow passage through the interior of pipe P, tool 10 may be withdrawn from pipe P.

Thus, a temporarily installable and easily removable tool providing for the bypass of any fluid within a pipe undergoing repair, is disclosed. The tool is of great advantage in work with copper pipes, but obviously may be used in pipes or conduits of virtually any material. While it is envisioned that the tool 10 of the present invention will be most commonly used in water pipes, it will be seen that tool 10 may be used in pipes or conduits carrying virtually any fluid, liquid or gas to assist in the repair thereof.

It is to be understood that the present invention is not limited to the sole embodiment described above, but encompasses any and all embodiments within the scope of the following claims.

I claim:

1. A tool for use in the repair of fluid conduits and pipes, said tool comprising:
   an externally threaded central bypass tube having a first end and a second end and means defining an axial passage completely therethrough;
   a compression tube concentrically surrounding said bypass tube and having a first end and a second end;
   a generally cylindrical expandable plug concentrically surrounding said bypass tube and having a first end and a second end;
   said expandable plug first end being positioned adjacent said first end of said bypass tube and retained by a retaining nut threadedly secured upon said bypass tube first end;
   said compression tube first end being positioned adjacent said expandable plug second end and said compression tube second end being positioned adjacent said bypass tube second end and retained thereon by an actuating nut secured upon said bypass tube second end;
   said first and second ends of said expandable plug are formed of a solid elastomeric material and include a substantially unimpeded hollow center section therebetween;
   a thin and expandable elastomeric wall enclosing said hollow center section;
   said first end of said expandable plug having a first thickness;
   said second end of said expandable plug having a second thickness;
   said first thickness being substantially equivalent to said second thickness;
   said hollow center section of said expandable plug having a third thickness;
   said third thickness being substantially less than said first thickness, whereby said first end of said bypass tube and said expandable plug of said tool are inserted into a conduit open end and advanced within the conduit past an area to be repaired and said actuating nut is advanced along said bypass tube second end to urge said compression tube against said expandable plug to thereby cause said expandable plug to compress axially and expand radially to prevent fluid passage along the interior of the conduit and provide for fluid passage through said axial passage of said bypass tube.

2. The tool of claim 1 wherein
   said expandable plug includes beveled exterior edges at said first end and said second end of said plug.

3. The tool of claim 1 wherein
   said expandable plug includes beveled exterior edges at said first end and said second end of said plug.

4. The tool of claim 1 including
   washers between said actuating nut and said compression tube second end and adjacent said first and second ends of said expandable plug.

5. The tool of claim 1 wherein
   at least said bypass tube and said compression tube are formed of stainless steel.

6. The tool of claim 4 wherein
   said bypass tube, said compression tube, said retaining nut, said actuating nut, and said washers are formed of stainless steel.

7. A tool for use in the repair of fluid conduits and pipes, said tool comprising:
   an externally threaded central bypass tube having a first end and a second end and means defining an axial passage completely therethrough;
   a compression tube concentrically surrounding said bypass tube and having a first end and a second end; and
   a generally cylindrical expandable plug concentrically surrounding said bypass tube and having a first end and a second end;
   said first and second ends of said expandable plug being formed of solid elastomeric material and include means defining a substantially unimpeded hollow center section therebetween, and a thin and expandable elastomeric wall enclosing said hollow center section;
   said expandable plug including beveled exterior edges at said first end and said second end of said plug;
   said expandable plug first end being positioned adjacent said first end of said bypass tube and retained by a retaining nut secured upon said bypass tube first end;
   said compression tube first end being positioned adjacent said expandable plug second end and said compression tube second end being positioned adjacent said bypass tube second end and retained thereon by an actuating nut secured upon said bypass tube second end;
   said tool further including washers between said actuating nut and said compression tube second end and adjacent said first and second ends of said expandable plug;
   said bypass tube, said compression tube, said retaining nut, said actuating nut, and said washers being formed of stainless steel;
   said first end of said expandable plug having a first thickness;

said second end of said expandable plug having a second thickness;

said first thickness being substantially equivalent to said second thickness;

said hollow center section of said expandable plug having a third thickness;

said third thickness being substantially less than said first thickness, whereby said first end of said bypass tube and said expandable plug of said tool are inserted into a conduit open end and advanced within the conduit pass an area to be repaired, and said actuating nut is advanced along said bypass tube second end to urge said compression tube against said expandable plug thereby to cause said expandable plug to compress axially and said wall of said center section of said plug to expand radially to prevent fluid passage along the interior of the conduit and provide for fluid passage through said axial passage of said bypass tube.

* * * * *